United States Patent [19]
Warchocki et al.

[11] Patent Number: 5,542,507
[45] Date of Patent: Aug. 6, 1996

[54] POSITION DEPENDENT VARIABLE OUTPUT TORQUE VISCOUS DAMPER

[75] Inventors: Mark Warchocki, Sanborn; Walter P. Pukalo, Cheektowaga, both of N.Y.

[73] Assignee: Vibratech, Inc., Buffalo, N.Y.

[21] Appl. No.: 343,114

[22] Filed: Nov. 22, 1994

[51] Int. Cl.⁶ .................... A63B 21/00; F16D 57/02
[52] U.S. Cl. .................... 188/290; 188/296; 188/276; 482/58
[58] Field of Search .................... 188/290, 293, 188/294, 296, 187, 307, 310; 192/58 B, 58 C; 482/110, 111, 112, 5, 6, 7, 58 X

[56] References Cited

U.S. PATENT DOCUMENTS

| | | | |
|---|---|---|---|
| 1,962,367 | 6/1934 | Smythe | 369/115 |
| 2,514,136 | 7/1950 | O'Connor | 74/574 |
| 2,514,137 | 7/1950 | O'Connor | 188/290 |
| 3,651,903 | 3/1972 | Butler et al. | 188/290 |
| 3,861,503 | 1/1975 | Nash | 188/276 |
| 4,171,802 | 10/1979 | Stoecker | 482/112 X |
| 4,295,546 | 10/1981 | Vollett | 188/378 |
| 4,645,199 | 2/1987 | Bloemendaal | 482/58 |
| 4,741,529 | 5/1988 | Bloemendaal | 482/112 |
| 4,938,322 | 7/1990 | Sugasawara et al. | 188/290 |
| 5,165,506 | 11/1992 | Guimbretiere | 188/290 |
| 5,190,511 | 3/1993 | Petree | 482/112 |
| 5,305,858 | 4/1994 | Haga et al. | 188/296 X |

*Primary Examiner*—Josie Ballato
*Attorney, Agent, or Firm*—Hill, Steadman & Simpson

[57] ABSTRACT

A rotary viscous damper having a disc surrounded by a housing and cover, the disc rotatable with a shaft which penetrates the housing, a gap provided between opposite sides of the disc and the inside surfaces of the housing and cover for receiving viscous fluid, and triangularly shaped indentations formed on opposing surfaces of the disc and the housing and cover, the indentations on the housing and the cover arranged at selective rotational positions. Rotation of the disc aligning opposing indentations on the discs and the housing and cover to create a rotary position of minimum torque and when misaligned, a rotary position of maximum torque. The oscillating torque value creates a nominal torque associated with the damper, but can be selectively installed to present a minimum torque at a particular rotational position. The invention is particularly adapted to rotary devices where rotational position can effect the available torque for driving the shaft, such as an exercise bicycle.

20 Claims, 3 Drawing Sheets

5,542,507

POSITION DEPENDENT VARIABLE OUTPUT TORQUE VISCOUS DAMPER

BACKGROUND OF THE INVENTION

The present invention relates to a rotary viscous damper, and in particular to a rotary viscous damper having a housing surrounding a disc which provides a variable output torque dependent on position of the disc with respect to the housing.

In a rotary viscous damper, a disc is located within a housing which provides a gap between side walls of the housing and opposite sides of the disc. The disc is typically connected to a shaft at its centerline, the shaft protruding outwardly of the housing. The housing is typically arranged to rotate, or is fixed, independently of the shaft. A viscous fluid is applied within the housing to fill the gaps on opposite sides of the disc. Thus, the disc is rotated by the shaft directly and the housing either is fixed, if used as a rotational drag or brake, or if used as a vibration damper, is rotated by a shearing force of the highly viscous fluid caused by rotation of the disc. When used as a drag or brake, the housing is fixed to be stationary and the viscous fluid can apply a resistive torque to the rotation of the disc by the shaft. When used as a damper, the housing is free to rotate with the disc and shaft, the rotary inertia of the housing and viscous fluid dampening out shaft vibrations.

Magnitude of the resistive torque is dependent upon several parameters, one of which is the shear gap dimension between the disc and the housing. It is known generally to vary the shear gap dimension to vary the resistive torque, such as disclosed in U.S. Pat. Nos. 5,165,506 and 4,938,322.

SUMMARY OF THE INVENTION

It is an object of the present invention to provide a variable output torque viscous damper, the output torque being dependent on the position of the disc with respect to the housing. It is an object of the invention to provide a viscous damper having overall adjustability and providing specific, high response position based variation in torque. It is an object of the present invention to provide a disc and housing combination wherein the output torque function can be selectively varied.

It is an object of the invention to provide a rotary viscous damper which provides varying resistive torque at different rotary positions. Such a damper can be utilized in a wide variety of machines, products and applications such as industrial, domestic, office, transportation, etc. and all such applications are encompassed by the present invention.

It is another object of the invention to provide a rotary viscous damper providing a drag for a resistive exercise bicycle or other rotary exercise device, which provides a minimum resistance torque at a particular rotary position of the output shaft, corresponding to the bicycle pedals aligned vertically.

The objects of the invention are achieved by providing a rotary viscous damper having a disc located between side walls of a surrounding housing, providing a shear gap between the disc and side walls wherein the shear gap is variable at rotary positions of the disc. To accomplish this, the disc and one or both side walls have spaced apart recesses around a circumference thereof. When recesses on the disc and side walls align, a plurality of local wide gaps are created which reduces the overall resistance torque of the damper. Additionally, the distance between the disc and the side walls can be varied to provide a further overall adjustment of the damper.

The invention is particularly adapted to a stationary exercise bicycle, although not limited to this application. By properly locating the rotary position of the housing recesses, a minimum resistive torque can be provided at the rotary position of the pedals which provides the minimum leverage, the pedals being vertically aligned. This reduced torque requirement produces a smooth, comfortable operation of the bicycle. By varying the rotary drag according to the position of the pedals, a torque profile can be created more closely matching the available leverage by the user. This results in an optimum exercise resistance throughout the user's range of motion for a maximum efficiency workout.

DETAILED DESCRIPTION OF THE PREFERRED EMBODIMENTS

Figure 1:
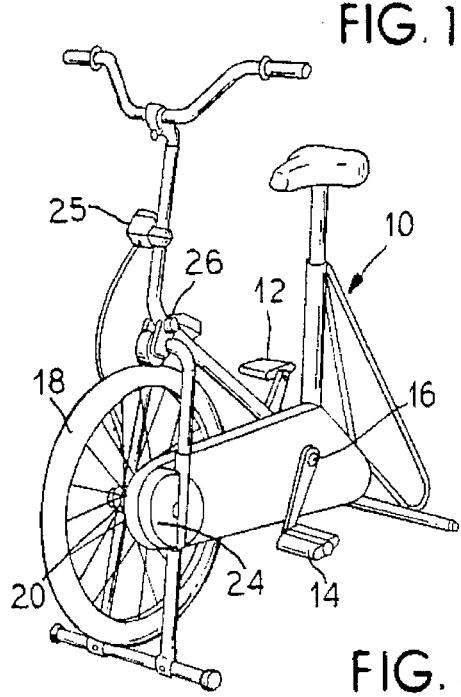
FIG. 1 is a perspective view of a rotary viscous damper of the present invention applied to an exercise bicycle.

FIG. 1 illustrates a stationary exercise bicycle 10 having rotary pedals 12, 14 mounted to a crank shaft 16 upon which is mounted a sprocket (not shown). A front wheel 18 is connected to a shaft 20 which is connected to a rotary viscous damper 24 of the present invention. A control 25 is connected to the damper 24. A mileage or speed indicator 26 is mounted to the wheel 18.

Figure 2:
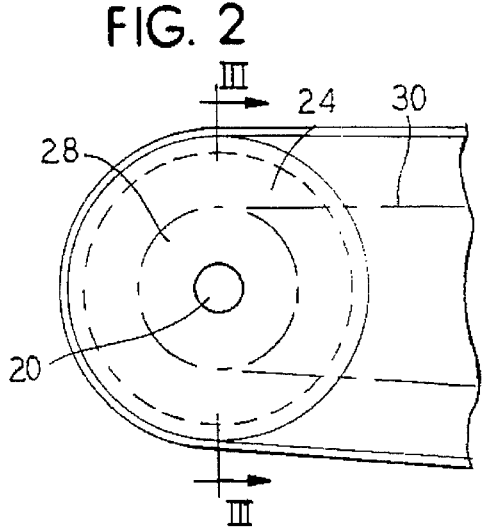
FIG. 2 is a partial enlarged elevation view of the rotary viscous damper shown in FIG. 1.

FIG. 2 illustrates the damper 24 being connected by the shaft 20 to a sprocket 28 around which is wrapped a chain 30. Turning the pedals 12, 14 circulates the chain which turns the wheel 18 and the damper as described below. Alternatively, the damper 24 can be directly mounted to the crank shaft 16. It is possible to thereby eliminate the wheel chain and sprocket for a simpler design.

Figure 3:
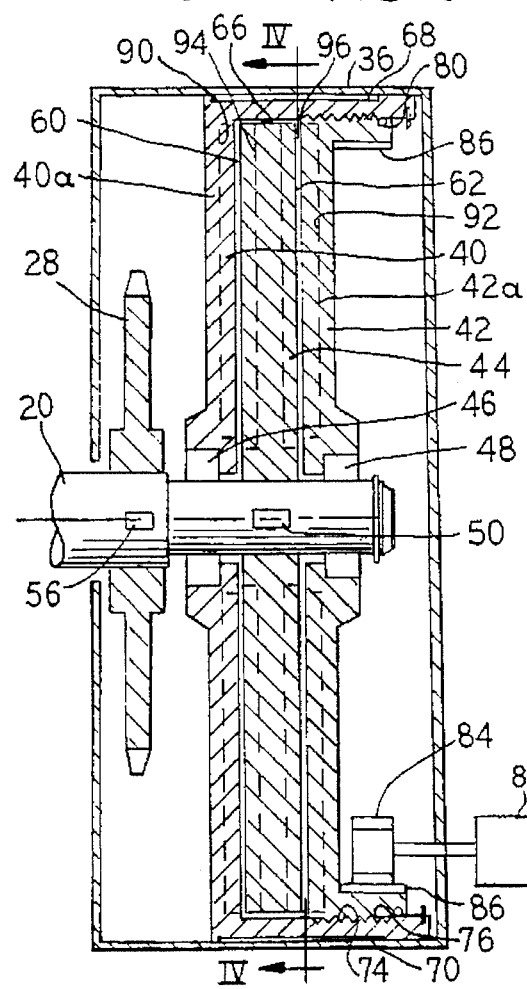
FIG. 3 is a sectional view taken generally along line III—III of FIG. 2.

FIG. 3 illustrates the construction of the rotary viscous damper. The damper provides a cover or housing 36 which functions to protect the bicycle rider from moving parts and to protect the moving parts from damage. Within the cover 36 is a housing 40 closed by a cover 42 with a disc 44 located therebetween. The shaft 20 is journaled to the housing 40 and the cover 42 by a front bearing 46 and a rear bearing 48. The disc 44 is attached to the shaft 20 via a key 50 to rotate therewith. The sprocket 28 is also keyed to the shaft at a key 56 to drive the shaft in rotary fashion.

A gap 60 is formed between the disc 44 and the housing 40, and a gap 62 is formed between the cover 42 and the disc 44. A band-shaped gap 66 is also formed between the housing 40 and the disc 44. The gap 60, 62 can be preset by fixing the distance between a wall 40a of the housing and a wall 42a of the cover, or as shown in FIG. 3, these gaps 60, 62 can be adjustable by making the walls 40a, 42a moveable relative to each other.

Although a single disc and housing is illustrated, the present invention is also adaptable to multistage dampers using a plurality of discs within a housing mounted along a shaft, or a multistage damper using multiple discs within multiple separate housings.

According to the embodiment of FIG. 3, the housing 40 is U-shaped in cross section and can be provided with at least one, and preferably two, slotted keyways 68, 70 for receiving a tab or rail fixedly mounted to the cover 36 which limits the movement of the housing 40 in an axial direction of the shaft 20 and prohibits rotation of the housing 40. The cover 42 is also U-shaped in cross section and provides around its outer perimeter a plurality of male threads 74 which engage a plurality of female threads 76 applied onto an inside surface of the housing 40.

An O-ring seal member 80 is applied between the cover 42 and the housing 40 to prevent any leakage of viscous fluid which fills the gaps 60, 62, 66. The housing 40 and the cover 42 are arranged to be movable along the shaft 20 over a range of gap distances in the axial direction of the shaft. Movement of the housing 40 and the cover 42 is accomplished by, for example, a pinion gear 84 engaged to inside circumference gear teeth 86 applied around the inside surface of the cover 42. The gear 84 is driven by a motor 88. Thus, by rotating the cover, the cover progresses axially along the threads 76 of the housing 40 to separate the housing from the cover or, upon reversing, drawing the housing and cover closer together. The housing can move along the keyways 68, 70 axially. The gaps 60, 62 are generally self-equalizing in width.

Alternately, a number of different devices can be used to selectively change the position of the cover 42 with respect to the housing 40 such as by a solenoid, a cam or eccentric mechanical device, a magnetic device such as a voice coil device, or any number of other positioning devices which are known in the art. Rather than circumferential threads 74, 76 a plurality of threaded studs could be applied between housing and cover to draw these parts together or force them apart.

The gaps 60, 62 can be changed intermittently or changed to vary the resistive torque at selected rotary positions of the disc by a controller C. As another aspect of the inventive arrangement, a plurality of recesses 90 are formed in the wall 40a and recesses 92 are formed in the wall 42a. Also, recesses 94 are formed in the disc facing the recesses 90 and recesses 96 are formed in the disc facing the recesses 92.

Figure 4A:
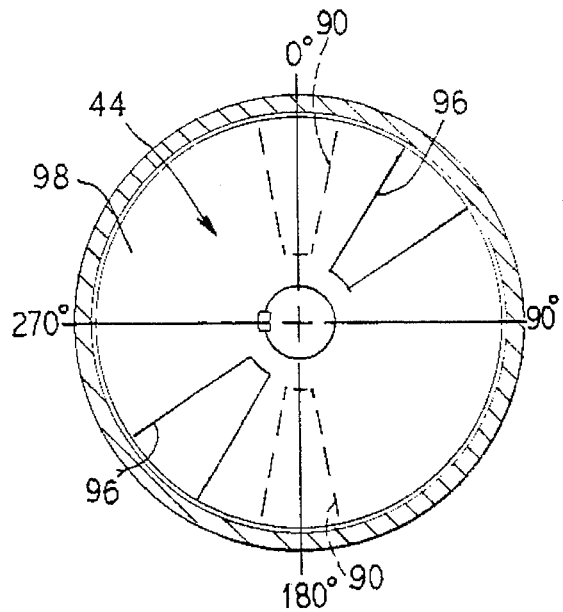
FIG. 4a is a sectional view taken generally along line IV—IV of FIG. 3.
Figure 4B:
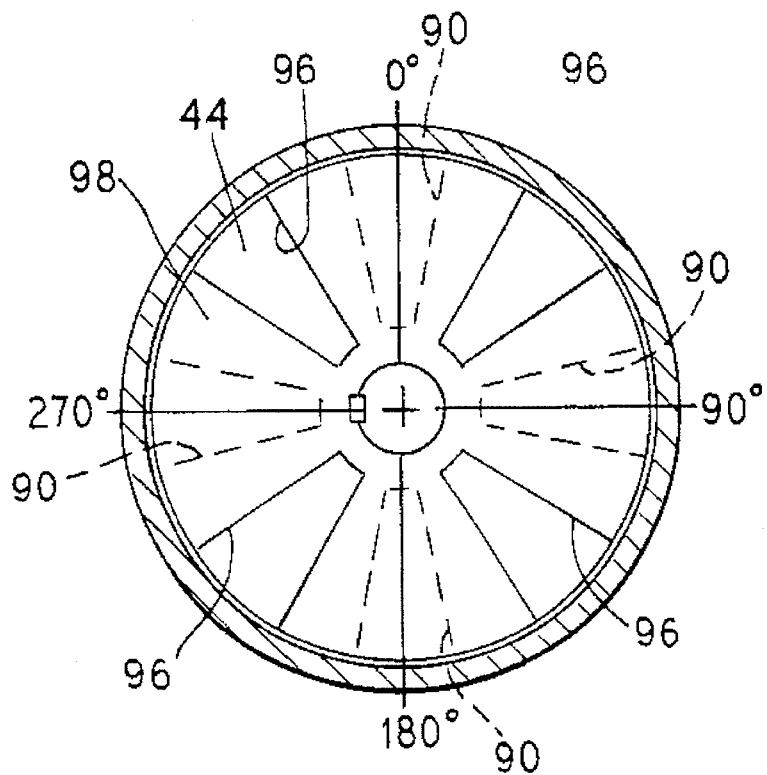
FIG. 4b is a sectional view similar to FIG. 4a for another inventive application.

As shown in FIGS. 4a and 4b, the recesses 96 comprise generally triangular segments increasing in width radially outwardly and indented from a surface 98 of the disc 44.

As shown in FIG. 4a, the recesses can be applied at 180° on the surface 98 of the disc. The recesses 90 in the wall 40a are shown dashed and are also arranged at 180° spaced from each other. The recesses 90 are arranged to align with the recesses 96 of the disc at the position where the pedals are vertically aligned, or close to that position.

For another application, the disc recesses 96 can also be arranged at four positions 90° spaced from each other as shown in FIG. 4b. The recesses 90 in the wall 40a are shown dashed and are also arranged at 90° points.

Figure 5:
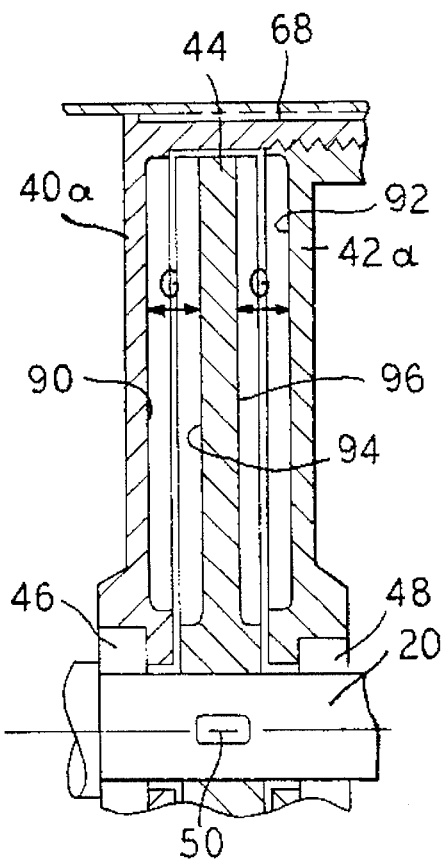
FIG. 5 is a partial sectional view of the arrangement as shown in FIG. 3 with the disc rotated 45°.

As shown in FIG. 5, when the recesses 90, 94 are rotated into alignment, local gaps G are created at, according to the arrangement of FIG. 4a, two places around the circumference of the disc. If the opposite recesses 92 are arranged to be in alignment with the recesses 96 at the same rotational position of the disc, the positional effect is increased. In the preferred embodiment, the recesses 94, 96 are in alignment rotationally as are the recesses 90, 92.

Thus, according to FIG. 5, if this orientation is arranged at the vertical position of the pedals of the bicycle of FIG. 1, a minimum resistive torque is created at this location corresponding to a minimum lever arm of the pedals. Thus, an easier pedaling is effected at the uppermost position of the pedal 12 and the pedal 14. The drag profile of the damper can thus be adjusted to more closely match the torque output of the user so that a maximum efficient exercise can be achieved. The user's muscles can be exercised at an optimized level throughout their range of motion. Not only exercise bicycles, but many other type devices where a positional variation of torque is desired could benefit from the viscous damper of the present invention.

It is worthwhile to note that the location of the recesses 90, 92 need not be vertically aligned; the alignment of the recesses 90, 92 with the recesses 94, 96 of the disc need only occur when the pedals are vertically aligned. The actual location and number of recesses 90, 92, 94, 96 depends on the gear ratio between the pedals and the disc.

Figure 6B:
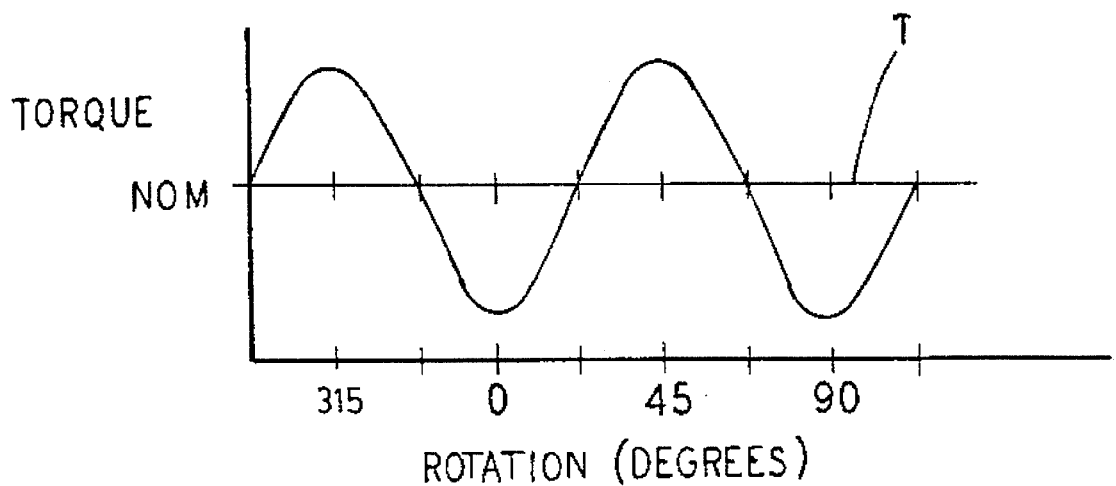
FIG. 6b is a graphical representation of the output torque of the damper of FIG. 4b versus rotary position.
Figure 6A:
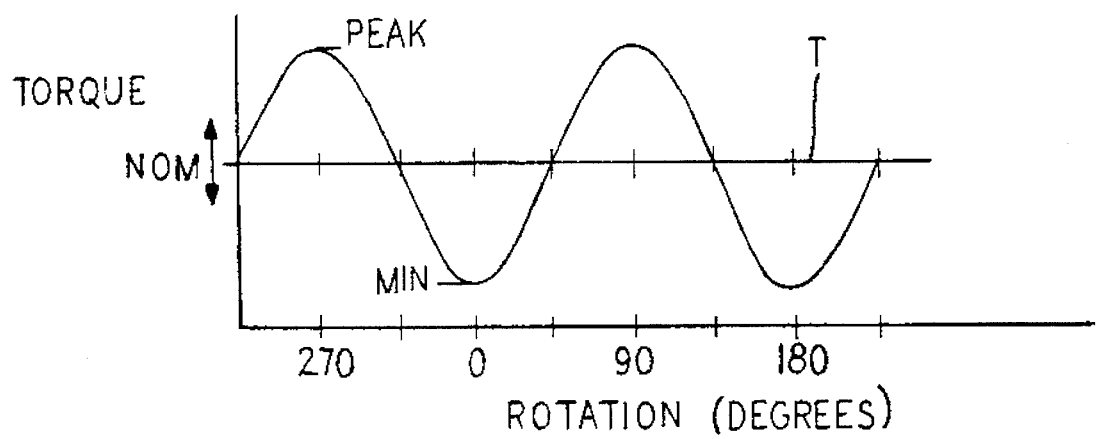
FIG. 6a is a graphical representation of the output torque of the damper of FIG. 4a versus rotary position.

FIG. 6a illustrates the torque response of the damper shown in FIG. 4a. For this damper with two recesses at each of the side walls and on each face of the disc, a minimum torque drag is achieved at 0° and 180° and maximum torque drag at approximately 90° and 270°.

FIG. 6b illustrates the torque response of the damper shown in FIG. 4b. It is noted that this damper having four recesses on each of the side walls and each side of the disc, has a minimum torque at the 0°, 90°, 180°, 270° and 360° positions where the recesses in the disc align with the recesses in the walls 40a, 42a. Maximum torques are expected where the recesses in the disc are halfway between the corresponding recesses in the walls 40a, 42a. These maximums would occur at 45°, 135°, 225° and 315°.

It is noted that in both FIGS. 6a, 6b, in the rotating operation of the damper, a mean torque would be realized, indicated by the straight line T. The recesses, gaps, fluid viscosity, etc. can be selectively applied to maintain a nominal torque while minimizing torque at certain rotational positions.

It should also be noted that many variations of recesses can be used to develop a desired torque/position curve. Also, it is possible that the number of recesses located on facing sides of the disc and housing and cover be different in number, shape, size, etc. to create a desired torque curve. The position of the recess on opposite side of the disc can be offset in position rotationally, and the recesses on the housing and cover can also be offset in rotational position.

Although the present invention has been described with reference to a specific embodiment, those of skill in the art will recognize that changes may be made thereto without departing from the scope and spirit of the invention as set forth in the appended claims.

We claim as our invention:

1. A rotary viscous damper, comprising:

a first member and a second member, said first member arranged to continuously rotate about an axis of rotation with respect to said second member, and said first and second members arranged having a first gap therebetween for filling with viscous fluid;

wherein said first member provides at least one first indentation on a first side thereof facing said first gap and said second member also has at least one second indentation facing said first gap and said first side of said first member said first and second indentations alignable at a rotary position of said first and second members.

2. A rotary viscous damper, comprising:

a first member and a second member, said first member arranged to rotate about an axis of rotation with respect to said second member, and said first and second members arranged having a first gap therebetween for filling with viscous fluid;

wherein said first member provides at least one indentation on a first side thereof facing said first gap and said second member also has at least one indentation facing said first gap and said first side of said first member;

wherein said at least one indentation on said first side of said first member comprises a plurality of indentations angularly spaced around said axis of rotation of said first member.

3. The damper according to claim 2, wherein said at least one indentation of said second member comprises a plurality of indentations angularly spaced around said axis of rotation of said first member.

4. A rotary viscous damper, comprising:

a first member and a second member, said first member arranged to rotate about an axis of rotation with respect to said second member, and said first and second members arranged having a first gap therebetween for filling with viscous fluid;

wherein said first member provides at least one indentation on a first side thereof facing said first gap and said second member also has at least one indentation facing said first gap and said first side of said first member;

wherein said first member comprises a disc and said second member comprises a housing and a cover mounted together surrounding said disc, said at least one indentation of said first member comprising a plurality of indentations on said first side carried on said disc, and further comprising a plurality of indentations on a second side of said disc, and said at least one indentation of said second member comprises a plurality of indentations on a wall of said housing facing said first side of said disc, and said cover comprises a plurality of indentations on a wall thereof facing said second side of said disc, a second gap formed between said cover and said second side of said disc.

5. The damper according to claim 4, wherein said plurality of indentations on said wall of said housing and said plurality of indentations on said wall of said cover are angularly aligned in one-to-one correspondence.

6. The damper according to claim 5, wherein said indentations are triangularly shaped recesses expanding radially outwardly of an axis of rotation of said disc.

7. The damper according to claim 4, wherein said housing and said cover are arranged to be selectively movable toward and away from each other to vary the first and second gaps between the first and second side of said disc and said wall of said housing and said wall of said cover; and means for selectively moving said cover and said housing to vary the first and second gaps between the disc and the housing and cover.

8. A stationary exercise device comprising:

a stationary frame;

opposing foot pedals mounted on a horizontal axle for rotation about an axis of said axle, said axle journaled to said frame;

means for converting rotation of said foot pedals to rotation of a shaft;

a first member and a second member, said first member arranged to rotate with respect to said second member, and said members arranged having a first gap therebetween and a viscous fluid filling the first gap;

wherein said first member provides at least one indentation on a first side thereof facing said first gap and said second member also has at least one indentation facing said first gap and said first side of said first member;

and said first member is fixedly connected to said shaft to rotate therewith, and said second member is fixed to said frame preventing rotation, said indentations on said first and second members arranged to align when said foot pedals are in vertical alignment.

9. The device according to claim 8, wherein said at least one indentation on said first side of said first member comprises a plurality of indentations angularly spaced around an axis of rotation of said first member.

10. The device according to claim 9, wherein said at least one indentation of said second member comprises a plurality of indentations angularly spaced around said axis of rotation of said first member.

11. The device according to claim 8, wherein said first member comprises a disc and said second member comprises a housing and a cover mounted together surrounding said disc, said at least one indentation of said first member comprising a plurality of indentations on said first side carried on said disc, and further comprising a plurality of indentations on a second side of said disc, and said at least one indentation of said second member comprises a plurality of indentations on a wall of said housing facing said first side of said disc and said cover comprises a plurality of indentations on a wall thereof facing said second side of said disc, a second gap defined between said cover and said second side of said disc.

12. The device according to claim 11, wherein said plurality of indentations on said wall of said housing and said plurality of indentations on said wall of said cover are rotationally aligned in one-to-one correspondence.

13. The device according to claim 12, wherein said indentations are triangularly shaped recesses expanding radially outwardly of an axis of rotation of said disc.

14. The device according to claim 11, wherein said housing and said cover are arranged to be selectively movable toward and away from each other to vary the overall gap between the first and second side of said discs and said wall of said housing and said wall of said cover; and means for selectively moving said cover and said housing to vary the overall gap between the disc and the housing and cover.

15. A rotary viscous damper, comprising:

a housing and a cover forming an enclosed space;

a disc located between said housing and said cover within said space, said disc arranged to rotate about an axis of rotation and said disc and said housing arranged having a first gap therebetween and said disc and said cover arranged having a second gap therebetween for filling with viscous fluid;

means arranged between said disc and said cover for reducing rotational drag by said viscous fluid on said disc at a select rotational position of said disc;

wherein said housing and said cover are arranged to be selectively movable toward and away from each other to vary the first and second gaps between the disc and said housing and said cover; and means for selectively moving said cover and said housing to vary the first and second gaps between the disc and the housing and cover.

16. A rotary viscous damper, comprising:

a housing and a cover forming an enclosed space;

a disc located between said housing and said cover within said space, said disc arranged to rotate about an axis of rotation and said disc and said housing arranged having a first gap therebetween and said disc and said cover arranged having a second gap therebetween for filling with viscous fluid;

wherein said housing and said cover are arranged to be selectively movable toward and away from each other to vary the first and second gaps between the disc and said housing and said cover; and motive means for selectively moving said cover and said housing to vary the first and second gaps between the disc and the housing and cover.

17. A stationary exercise device comprising:

a stationary frame;

opposing foot pedals mounted on a horizontal axle for rotation about an axis of said axle, said axle journaled to said frame;

means for converting rotation of said foot pedals to rotation of a shaft;

a first member and a second member, said first member arranged to rotate with respect to said second member, and said members arranged having a first gap therebetween and a viscous fluid filling the first gap;

and said first member is fixedly connected to said shaft to rotate therewith, and said second member is fixed to said frame preventing rotation;

means arranged between said first member and said second member for reducing rotational drag by said viscous fluid on said first member at select rotational position of said pedals;

wherein said second member is arranged to be movable toward said first member; and motive means for selectively moving said second member with respect to said first member to vary the first and second gaps.

18. A rotary viscous damper, comprising:

a first member and a second member, said first member arranged to continuously rotate about an axis and located adjacent said second member across a gap filled with viscous fluid, said first member connected to an axially aligned output shaft; and means for adjusting a profile of said gap at a select rotary position of said first member to periodically alter the viscous drag on said first member by said viscous fluid as said first member rotates continuously about said axis.

19. The damper according to claim 18, wherein said means comprises at least one first indentation on said first member and at least one second indentation on said second member arranged to be in alignment at said selected rotary position.

20. The damper according to claim 18, wherein said means comprises a motive means for selectively changing the distance between said first and second member.

* * * * *